(12) United States Patent
Zuther et al.

(10) Patent No.: US 12,214,805 B2
(45) Date of Patent: Feb. 4, 2025

(54) METHOD AND DEVICE FOR LOCATING A VEHICLE IN A SURROUNDING AREA

(71) Applicant: Valeo Schalter und Sensoren GmbH, Bietigheim-Bissingen (DE)

(72) Inventors: Sebastian Zuther, Bietigheim-Bissingen (DE); Rolf Dubitzky, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 390 days.

(21) Appl. No.: 17/630,646

(22) PCT Filed: Jul. 27, 2020

(86) PCT No.: PCT/EP2020/071077
§ 371 (c)(1),
(2) Date: Jan. 27, 2022

(87) PCT Pub. No.: WO2021/018815
PCT Pub. Date: Feb. 4, 2021

(65) Prior Publication Data
US 2022/0266864 A1    Aug. 25, 2022

(30) Foreign Application Priority Data
Aug. 1, 2019    (DE) .................. 10 2019 120 778.9

(51) Int. Cl.
*B60W 60/00* (2020.01)
*B60W 10/18* (2012.01)
(Continued)

(52) U.S. Cl.
CPC ........ *B60W 60/0016* (2020.02); *B60W 10/18* (2013.01); *B60W 30/146* (2013.01);
(Continued)

(58) Field of Classification Search
CPC ............ B60W 60/0016; B60W 10/18; B60W 30/146; B60W 40/02; B60W 60/005;
(Continued)

(56) References Cited

U.S. PATENT DOCUMENTS

| 6,415,221 | B1 * | 7/2002 | Egberts ................. G01C 21/30 701/534 |
| 2018/0087907 | A1 | 3/2018 | DeBitetto et al. |

(Continued)

FOREIGN PATENT DOCUMENTS

| DE | 102007058192 A1 | 6/2009 |
| DE | 102010003375 A1 | 9/2011 |

(Continued)

OTHER PUBLICATIONS

International Search Report and Written Opinion in corresponding International Application No. PCT/EP2020/071077, mailed Nov. 6, 2020 (16 pages).

(Continued)

*Primary Examiner* — Harry Y Oh
*Assistant Examiner* — Dylan M Katz
(74) *Attorney, Agent, or Firm* — Osha Bergman Watanabe & Burton LLP

(57) ABSTRACT

The invention relates to a method for locating a vehicle (1) in a surrounding area, comprising the following steps: providing a primary sensor system (2, 34, 41, 52); providing a secondary sensor system (4, 35, 44, 56), the secondary system being configured in such a manner as to provide a backup to the primary system, the primary sensor system and the secondary sensor system being configured in such a manner as to completely control the vehicle; detecting environment data by means of the primary sensor system and the secondary sensor system; creating maps of the surroundings from the environment data from the primary (Continued)

Figure 1:
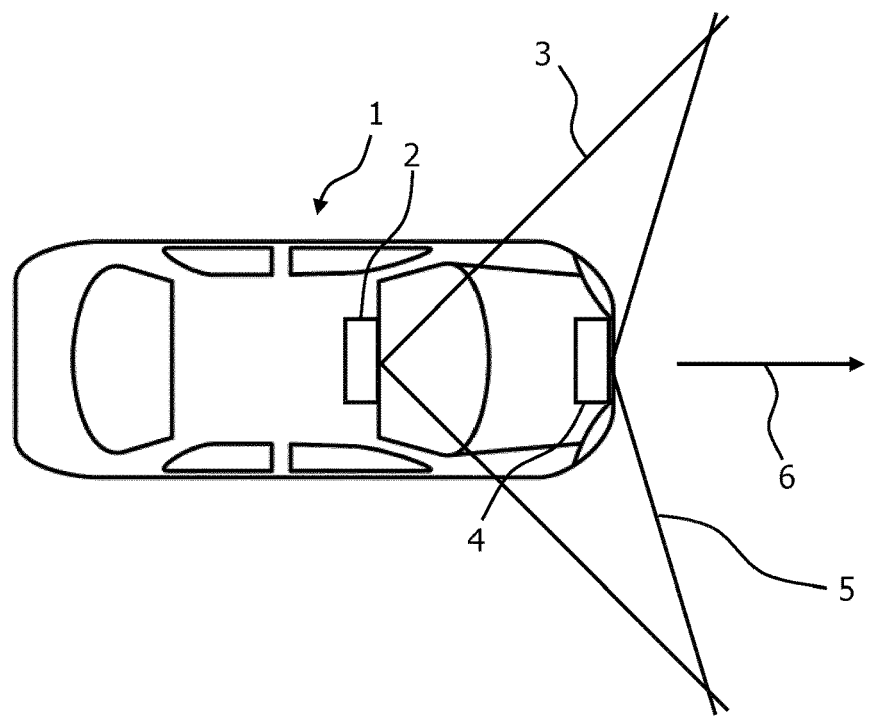

sensor system and the secondary sensor system by means of a computer system; transferring the maps of the surroundings created from the primary sensor system and the maps of the surroundings created from the secondary sensor system to the computer system; generating at least one plausibility-checked primary sensor system sub-map and at least one plausibility-checked secondary sensor system sub-map by means of the computer system; transferring the plausibility-checked primary sensor system sub-map to the primary sensor system and transferring the plausibility-checked secondary sensor system sub-map to the secondary sensor system; locating the vehicle in the surrounding area by matching the environment data from the primary sensor system with the plausibility-checked primary sensor system sub-map and by matching the environment data from the secondary sensor system with the plausibility-checked secondary sensor system sub-map; comparing the location of the vehicle determined by the primary sensor system with the location of the vehicle determined by the secondary sensor system.

14 Claims, 2 Drawing Sheets

(51) Int. Cl.
*B60W 30/14* (2006.01)
*B60W 40/02* (2006.01)
*G01S 17/86* (2020.01)
*G01S 17/89* (2020.01)
*G01S 17/931* (2020.01)
*G06V 20/56* (2022.01)
*H04W 4/48* (2018.01)

(52) U.S. Cl.
CPC .......... *B60W 40/02* (2013.01); *B60W 60/005* (2020.02); *G01S 17/86* (2020.01); *G01S 17/89* (2013.01); *G01S 17/931* (2020.01); *G06V 20/56* (2022.01); *H04W 4/48* (2018.02); *B60W 2420/403* (2013.01); *B60W 2420/408* (2024.01); *B60W 2556/35* (2020.02); *B60W 2556/40* (2020.02)

(58) Field of Classification Search
CPC ..... B60W 2420/403; B60W 2420/408; B60W 2556/35; B60W 2556/40; B60W 2556/45; B60W 50/0205; B60W 60/0053; B60W 2050/0006; B60W 50/023; G01S 17/86; G01S 17/89; G01S 17/931; G06V 20/56; H04W 4/48; G01C 21/30; G01C 21/3804; G01C 21/3885; G01C 21/3602; G05D 1/0246; G05D 1/0274
See application file for complete search history.

(56) References Cited

U.S. PATENT DOCUMENTS

| | | | |
|---|---|---|---|
| 2019/0236862 A1* | 8/2019 | Mercep | G08G 1/165 |
| 2020/0174113 A1* | 6/2020 | Lee | G01S 13/931 |
| 2022/0236064 A1* | 7/2022 | Takeda | G01C 21/30 |

FOREIGN PATENT DOCUMENTS

| | | |
|---|---|---|
| DE | 102012215465 A1 | 3/2014 |
| DE | 102014213171 A1 | 10/2015 |
| DE | 102016224329 A1 | 6/2018 |
| DE | 102018129735 A1 | 5/2020 |
| EP | 2604478 B1 | 1/2018 |
| EP | 3208635 B1 | 1/2019 |
| JP | 2016181031 A | 10/2016 |
| JP | 2018073010 A | 5/2018 |
| WO | 2019/082669 A1 | 5/2019 |

OTHER PUBLICATIONS

German Search Report issued in corresponding German Application No. 10 2019 120 778.9, dated Feb. 27, 2020 (7 pages).
Office Action in Corresponding JP Application No. 2022-506561, Dated Mar. 3, 2023. (14 pages with English Translation).

* cited by examiner

METHOD AND DEVICE FOR LOCATING A VEHICLE IN A SURROUNDING AREA

The present invention relates to a method for locating a vehicle in an environment. The present invention also relates to a device for locating a vehicle in an environment. The present invention furthermore relates to a driver assistance system and to a computer program.

Future driver assistance systems will require environment detection and modeling in addition to information about the current driving status. Depending on the complexity of the assistance function, this will have a different level of detail, with the highest requirements applying to safety systems such as for example an automatic braking intervention. Both the geometric and the dynamic features of potential collision partners have to be determined as accurately as possible. Since no currently available sensor system is capable of meeting all requirements, sensor data fusion of heterogeneous sensors is necessary. The advantages of radar sensors in terms of determining dynamic object properties may be combined here with the advantages of optical systems in terms of determining geometric features. For an optimal fusion, however, different aspects have to be taken into consideration.

Modern driver assistance systems are showing a development trend from a pure comfort system that supports the driver and relieves the burden of routine activities toward warning and safety systems that actively contribute to reducing or avoiding the consequences of accidents. The step from a cruise control system to a pre-crash or collision avoidance system in this case places considerable demands on sensor-based surroundings detection, with not only the dynamics of objects but also their shape parameters having to be taken into consideration.

Camera-based systems are already known from the prior art and perceive and process the environment during operation and derive mini-maps of the static environment therefrom for the route being traveled. These mini-maps are sent to a backend via a mobile radio link. These mini-maps are then integrated into larger maps using suitable methods, or the stored maps are updated using suitable algorithms. In order to circumvent the weaknesses of the camera sensor system, for example no detection of lanes when the sun is low or concealed traffic signs, parts of the stored maps (partial maps) are in turn transmitted back to the automated vehicle via the mobile radio link.

The vehicle system uses the camera's perception and compares it with the received map in order to locate itself precisely therein.

The disadvantage of these camera-based systems is that the only redundancy is the use of a digital map. However, this does not contain any road users and may also contain systematic errors. This thus involves only partial redundancy. Since this system is based only on a single camera, it may be the case that the camera does not detect all road users. It may also be the case that the camera has systematic errors in terms of detecting obstacles. These are then not perceived in the vehicle or on the map or on the partial map. This will inevitably lead to accidents in which the driver was inattentive and the system was not able to perceive all relevant information or receive it via the digital map, which may under certain circumstances be out of date.

The prior art also discloses systems that improve perception with the aid of sensor fusion and heterogeneous sensor systems (for example camera, radar, lidar). However, since every sensor system has its weaknesses, this leads to a large number of sensors to be used and thus to high system costs. The high system costs have until now been a barrier to automated vehicles being able to establish themselves on a large scale.

The currently available automated driving systems mostly use cameras and radar sensors. The advantage of the camera is the semantic information, and the advantage of the radar is the accurate distance information. The weakness of a radar sensor however lies in the poor lateral position resolution and in the fact that the radar sensor is not able at all, or able only very poorly, to detect objects made of plastic or with a small radar backscatter cross section. Although digital maps may be constructed using radar sensors, these are mostly of only poor quality and contain little to no semantic information. In addition, lanes are not able to be identified by the radar sensor system.

DE 10 2007 058 192 A1 describes a central controller for a plurality of assistance systems provided in a motor vehicle, each of which operates individually and of which at least one assistance system is equipped with surroundings sensors. The central controller is connected to the individual assistance systems and is designed to receive sensor information from the assistance systems, to evaluate it and to report status and/or control commands back to the assistance systems. In order also to be able to implement safety-relevant interventions in the driving dynamics by way of the assistance systems, it is proposed for the central controller to have a safety monitoring unit that is designed to inspect non-redundant sensor information from the individual assistance systems by way of analytical redundancies of various sensor information received from the central controller.

DE 10 2010 003 375 A1 discloses a surroundings assessment system in a vehicle with an electronic controller, with sensor means for detecting objects in the surroundings of the vehicle and with evaluation means for assessing objects in the surroundings of the vehicle with regard to the relevance of the objects as target objects for a warning control or regulation system in the vehicle, wherein the controller is connected to the sensor means and comprises the evaluation means. The controller is designed such that objects are able to be detected by first sensor means and by second sensor means. In a first operating mode of the controller, an object is considered to be a relevant target object only if it is detected both by the first sensor means and by the second sensor means. In a second operating mode of the controller, an object is selected as relevant target object if it is detected only by the first sensor means.

DE 10 2012 215 465 discloses a method for filtering object information, wherein first object information and second object information are read in, wherein the first object information represents at least one object detected and identified by a first sensor and the second object information represents at least two objects detected and identified by a second sensor, wherein the first sensor is based on a first sensor principle and the second sensor is based on a second sensor principle, wherein the first sensor principle differs from the second sensor principle, wherein at least one of the objects in the second object information is also represented in the first object information, wherein filtered object information is output that represents those objects that are represented in the second object information and are not represented in the second object information.

EP 2 604 478 B1 discloses a method for determining the actual performance parameter of a multi-sensor arrangement on the basis of information from the data fusion of data received from sensors, for example radar sensor and camera sensor of the sensor arrangement. The data fusion is carried out in order to detect the actual vehicle environment. The ascertained parameter is compared with the expected performance parameter of the sensor arrangement. Based on the result of the comparison of the actual parameter with the expected parameter, a determination is performed as to whether or not there is a malfunction of the sensors.

EP 3 208 635 B1 discloses a method and a system that performs a low-level fusion of radar or lidar data with an image from a camera. The system comprises a radar sensor, a camera and a control system. The radar sensor is used to acquire a radar signal that is reflected from an object in a radar field of view. The camera is used to record an image of the object in a camera field of view that overlaps the radar field of view. The control system is connected to the radar sensor and the camera. The control system is configured so as to determine a position of a radar detection in the image displayed by the radar signal, to determine a parametric curve of the image based on the radar detections, to define an area of interest of the image based on the parametric curve that is derived from the radar detection, and to process the area of interest of the image in order to determine an identity of the object.

Proceeding from the abovementioned prior art, the invention is therefore based on the object of specifying a method for locating a vehicle in an environment, in which method the locating is improved by a redundant system and the availability and the fail-safety of a system for the automated driving of a vehicle is thereby improved.

The object is achieved according to the invention by the features of the independent claims. Advantageous embodiments of the invention are specified in the dependent claims.

According to the invention, what is thus specified is a method for locating a vehicle in an environment, comprising the following steps:
  providing a primary sensor system,
  providing a secondary sensor system, wherein the secondary system is designed to provide protection for the primary system, wherein the primary sensor system and the secondary sensor system are designed to completely control the vehicle,
  detecting environment data by way of the primary sensor system and the secondary sensor system,
  creating environment maps from the environment data of the primary sensor system and the secondary sensor system by way of a computer system,
  transmitting the created environment maps of the primary sensor system and the created environment maps of the secondary sensor system to the computer system,
  generating at least one plausibility-checked primary sensor system partial map and at least one plausibility-checked secondary sensor system partial map by way of a computer system,
  transmitting the plausibility-checked primary sensor system partial map to the primary sensor system and transmitting the plausibility-checked secondary sensor system partial map to the secondary sensor system,
  locating the vehicle in the environment by comparing the environment data of the primary sensor system with the plausibility-checked primary sensor system partial map and by comparing the environment data of the secondary sensor system with the plausibility-checked secondary sensor system partial map,
  comparing the locating of the vehicle by the primary sensor system with the locating of the vehicle by the secondary sensor system,
  granting clearance to continue automated driving of the vehicle by way of the primary sensor system and by way of the secondary sensor system if the locating of the vehicle lies within predefined limits,
  performing a driving procedure as soon as the clearance of one of the two sensor systems has not been granted and the locating of the vehicle from one of the two sensor systems does not lie within the predefined limits.

The basic idea of the present invention is therefore that of locating the vehicle in the environment by comparing the environment data of a primary sensor system with a plausibility-checked primary sensor system partial map and by comparing the environment data of a secondary sensor system with a plausibility-checked secondary sensor system partial map. This provides a redundant system with heterogeneous perception. The secondary sensor system additionally implements a fallback level in the event that the primary sensor system has failed, is no longer operational or has established that it is available only to a limited extent. This improves the availability and the fail-safety of the system. In addition, the secondary sensor system contributes to improving the active perception of the primary sensor system by way of plausibility-checked partial maps, thereby also improving an automated driving function of a vehicle.

In one advantageous embodiment of the invention, the step of generating at least one plausibility-checked primary sensor system partial map and at least one plausibility-checked secondary sensor system partial map comprises the following further steps:
  creating a fusion map on the basis of the environment map of the primary sensor system and the environment map of the secondary sensor system,
  using the fusion map to create the plausibility-checked primary sensor system partial map and to create the plausibility-checked secondary sensor system partial map.

In a further advantageous embodiment of the invention, the computing system comprises a computing unit of the primary sensor system and a computing unit of the secondary sensor system, wherein environment maps are created from the environment data of the primary sensor system by way of the computing unit of the primary sensor system and environment maps are created from the environment data of the secondary sensor system by way of the computing unit of the secondary sensor system. In one advantageous embodiment of the invention, the computing system comprises a third computing unit, wherein the step of generating at least one plausibility-checked primary sensor system partial map and at least one plausibility-checked secondary sensor system partial map are performed on the third computing unit.

In a further advantageous embodiment of the invention, the third computing unit is part of a backend, wherein the backend is located outside the vehicle.

In one advantageous embodiment of the invention, the step of transmitting the created environment maps of the primary sensor system and the created environment maps of the secondary sensor system to the computer system takes place by way of a wireless data link.

In a further advantageous embodiment of the invention, the primary sensor system is a camera-based sensor system.

In one advantageous embodiment of the invention, the secondary sensor system is a lidar-based sensor system.

In a further advantageous embodiment of the invention, the step of performing a driving procedure comprises an emergency braking procedure or a stopping procedure within a lane or slow coasting within a lane.

According to the invention, what is also specified is a device for locating a vehicle in an environment, wherein the device is designed so as to perform the method according to one of the above-described embodiments of the invention.

According to the invention, what is also specified is a driver assistance system at least having a module, which is designed to carry out the method according to one of the above-described embodiments of the invention.

According to the invention, what is also specified is a computer program product having program code means that are stored in a computer-readable medium in order to perform the method according to one of the above-described embodiments of the invention when the computer program product is run on a processor of an electronic control unit.

The invention is explained in more detail below with reference to the attached drawing and on the basis of preferred embodiments. The illustrated features may represent an aspect of the invention both individually and in combination. Features of different exemplary embodiments may be transferred from one exemplary embodiment to another.

Figure 2:
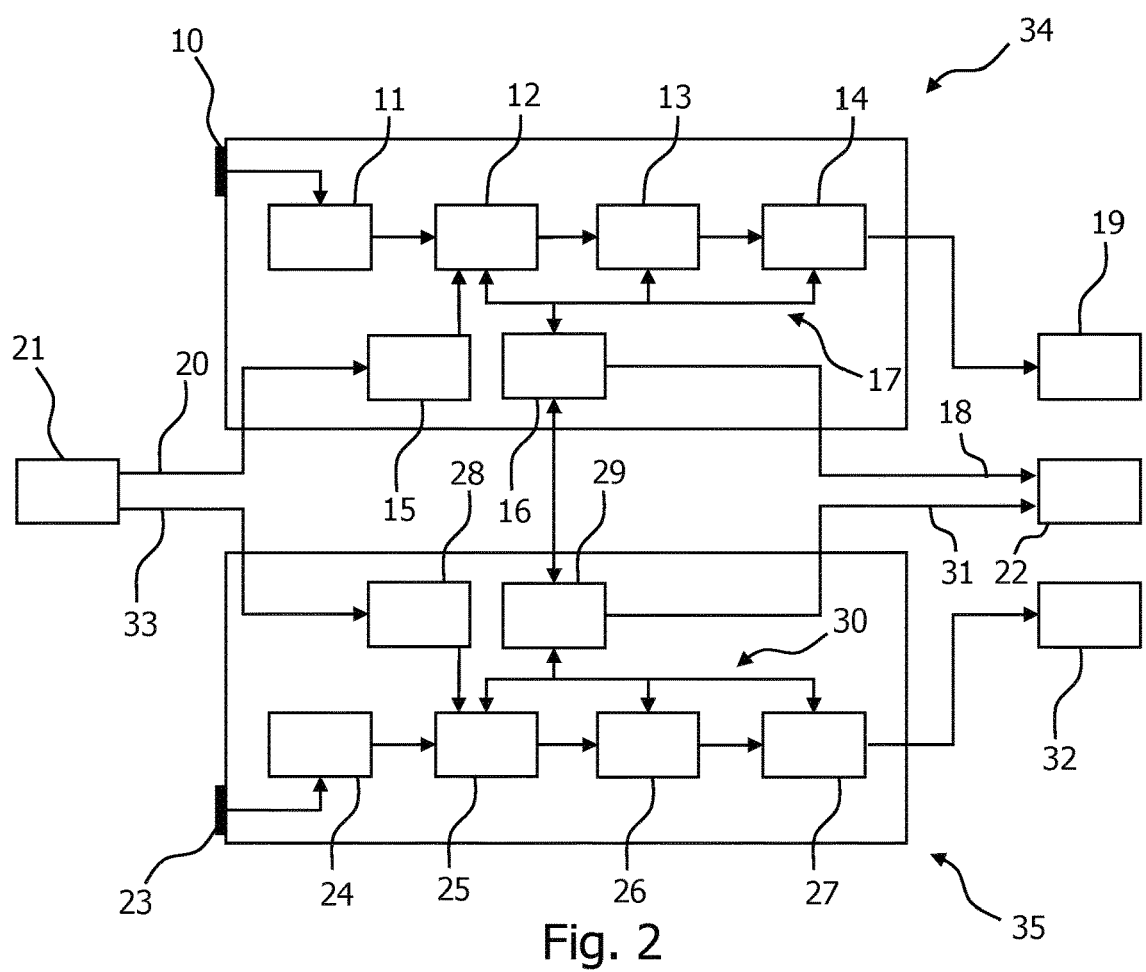
Figure 3:
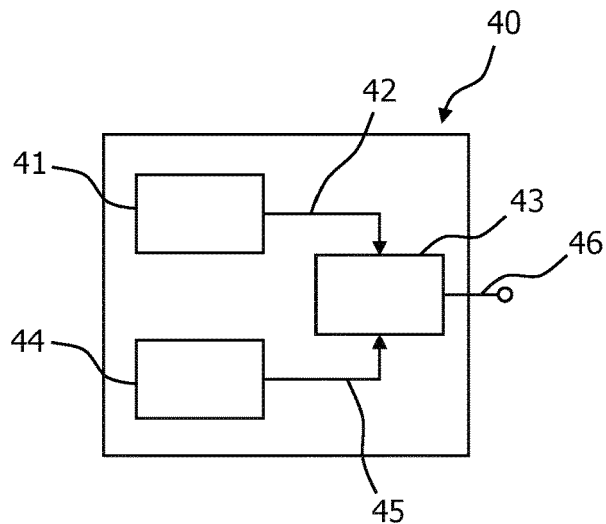
Figure 4:
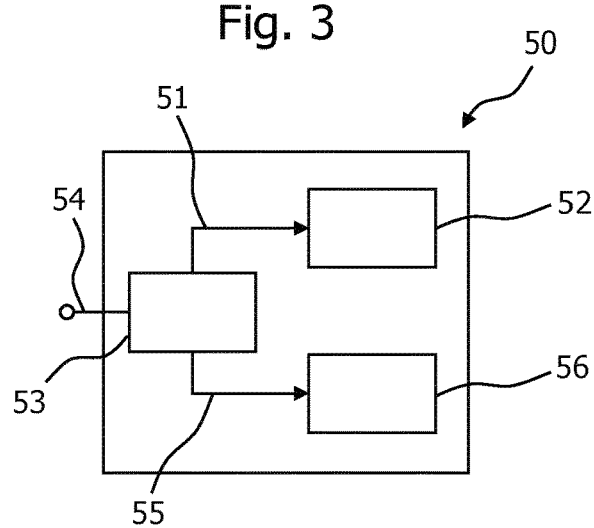
Figure 5:
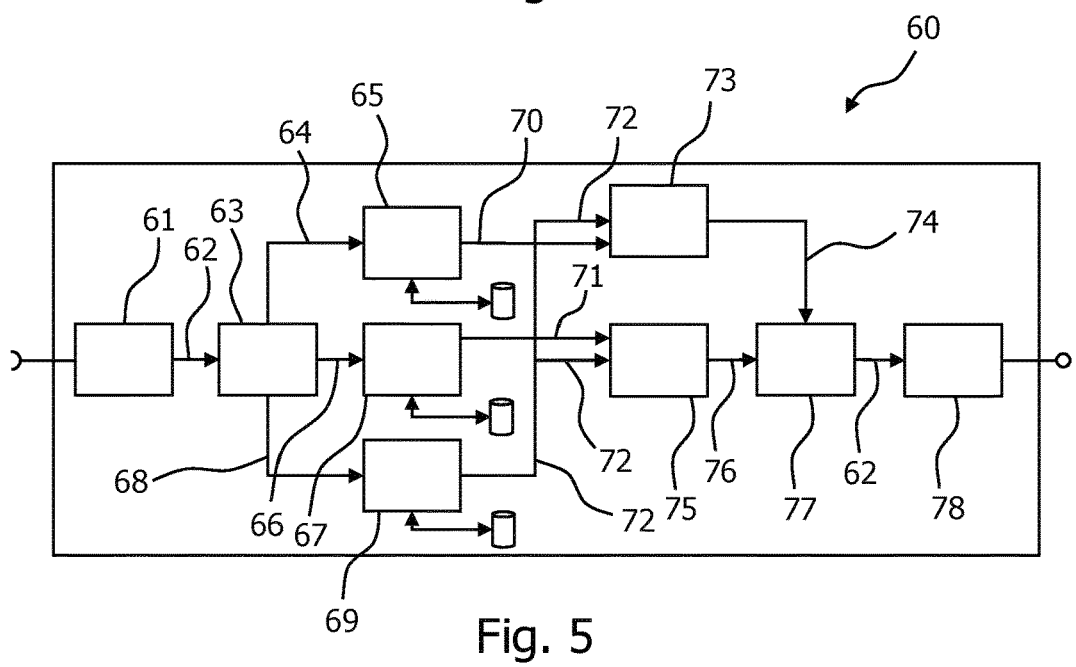

In the drawings:

FIG. 1 shows a schematic view of an automated vehicle with indicated detection ranges of various sensor systems, FIG. 2 shows a schematic block diagram of a device for carrying out a method for locating a vehicle in an environment according to one exemplary embodiment of the invention, FIG. 3 shows a schematic block diagram of the transmission according to one exemplary embodiment of the invention, FIG. 4 shows a schematic block diagram of the reception of plausibility-checked partial maps according to one exemplary embodiment of the invention, FIG. 5 shows a schematic flowchart of a processing process of the method in the backend according to one exemplary embodiment of the invention.

FIG. 1 shows an automated vehicle 1 having two different sensor systems 2, 4. The sensor systems 2, 4 may be for example a camera-based system 2 and, on the other hand, a lidar-based system 4. FIG. 1 shows that the sensor systems 2, 4 are arranged in the direction of travel 6 of the vehicle 1 and have different detection ranges 3, 5. One of these sensor systems 2, 4 in this case constitutes a primary sensor system 2, and the other constitutes a secondary sensor system 4. By way of example, the camera-based system 2 may take on the role of the primary sensor system 2. The role of the primary sensor system may however also be taken on by the lidar-based system 4. It is particularly advantageous for this system that no expensive 360° sensor or a sensor with a particularly large horizontal detection range is required for the lidar sensor 4. A horizontal detection range of approx. 100-120° is sufficient. A flash lidar may also be used for the lidar-based sensor system 4. The advantage of the flash lidar here is the perception of semantic information, such as for example traffic signs or traffic lights. The manufacturing costs are also very low.

FIG. 2 shows a schematic block diagram of the data processing of a method for locating a vehicle 1 in an environment according to one exemplary embodiment of the invention. The device comprises two sensor systems 2, 4: a camera-based sensor system 2 and a lidar-based sensor system 4.

The camera-based sensor system 2 in this case comprises a camera 10 by way of which the environment of the vehicle is recorded. The camera 10 may be for example a front camera 10 of the vehicle. When recording the environment by way of the front camera 10, static obstacles, but also other road users, are recorded. An environment map 18, 64, 42 of the environment is then created from the environment data, recorded by the camera 10, of the camera-based sensor system or primary sensor system 2, 34, 41, 52. The environment map 18, 64, 42 may in particular be a mini-map of the environment. The environment map 18, 64, 42 is created in this case by way of a computing unit of a computing system. The computing unit may in particular be part of the camera-based sensor system 2. It is also advantageous in this case for the computing unit of the camera-based sensor system 2 to be sufficiently dimensioned so as to completely contain the necessary signal processing steps and the automated driving function.

The mini-map or the environment map 18, 64, 42 of the primary sensor system 2, 34, 41, 52 based on the environment data of the camera 10, hereinafter also referred to as camera mini-map 2, 34, 41, 52, is then transmitted to a further computing unit 60 via a data link. The further computing unit 60 may in particular be a backend 60. The backend 60 may also in this case be located outside the vehicle and connected to the vehicle 1 by way of a wireless data link. By way of example, a mobile radio data link may be provided for the data transmission. Provision may in particular be made for a mobile radio link in accordance with the new 5G standard for the data transmission, this having sufficient bandwidth for the data transmission. For the transmission of the mini-maps 18, 64, 42, 31, 66, 45 to the backend 60, the device shown in FIG. 2 has a mobile radio transmitter 22 and a mobile radio receiver 21. Provision may in particular be made for the mobile radio transmitter 22 and the mobile radio receiver 21 to be used jointly by the camera-based sensor system 2 and the lidar-based sensor system 4. The mini-maps 18, 64, 42 transmitted to the backend 60 are received by a server of the backend 60 and processed and plausibility-checked partial maps (plausibility-checked camera partial map or plausibility-checked primary sensor system partial map) 20, 51, 74 are created, which are transmitted back to the camera-based sensor system 2, 4.

The camera-based sensor system 2 locates the vehicle 1 in the environment by comparing the environment data of the primary sensor system 2, 34, 41, 52 with the plausibility-checked primary sensor system partial map 33, 55, 76.

The lidar-based sensor system 4 uses a lidar sensor 23 to detect the environment. Just like the camera-based sensor system 2, the lidar-based sensor system 4 detects static obstacles, but also other road users in the environment of the vehicle 1. From these acquired sensor data, the lidar-based sensor system 4 also creates at least one environment map 4, 35, 44, 56 or a mini-map of the environment (lidar mini-map or environment map 31, 66, 45 of the secondary sensor system) 4, 35, 44, 56, transmits it to a backend 60 and receives processed and plausibility-checked partial maps (plausibility-checked secondary sensor system partial map or plausibility-checked lidar partial map) 33, 55, 76 from this server. The system likewise locates the vehicle by comparing the environment data recorded by the lidar sensor with the plausibility-checked lidar partial map 33, 55, 76.

The signal processing of the two sensor systems 2, 4 may in principle have the same structure and comprise the same processing steps. After the acquisition 11, 24 of environment data by way of the camera 10 or the lidar sensor 13, objects in the environment of the vehicle are perceived 12, 25 in the environment data. The vehicle is then located 12, 25 in the environment. These data may then be used to schedule possible measures 13, 26 on the basis of the detected objects and the locating of the vehicle 1 in the environment. The vehicle 1 is located in the environment by comparing the environment data of the primary sensor system 2, 34, 41, 52 with the plausibility-checked primary sensor system partial map 33, 55, 76 and by comparing the environment data of the secondary sensor system 4, 35, 44, 56 with the plausibility-checked secondary sensor system partial map 33, 55, 76. The locating of the vehicle by the primary sensor system 2, 34, 41, 52 is compared with the locating of the vehicle by the secondary sensor system 4, 35, 44, 56.

For this purpose, provision may be made in particular for a clearance check 14, 27 to take place before one of the two sensor systems 2, 4 initiates further measures.

Both sensor systems 2, 4 send the results of the processing steps 16, 29 to one another and compare whether they are compatible with those of the other sensor system 2, 4 to within defined limits. If this is the case, the respective sensor system 2, 4 transmits a clearance 14, 27 to the other sensor system 2, 4. Automated driving is continued only if both sensor systems 2, 4 grant a clearance 14, 27. The clearance check 14, 27 may be taken on directly in the sensor systems 2, 4, but also outside of a vehicle logic. As soon as one of the two sensor systems 2, 4 no longer grants a clearance 14, 27 for a certain time, the automated driving is stopped and a switch is made to a fallback mode. In this fallback mode, the vehicle 1 is put into a state that is safe for the occupants and the other road users. Here, a driving procedure is scheduled and transmitted by both sensor systems 2, 4, this in turn being mutually checked. If the check is successful, then the driving procedure is performed until it is completed. If no driving procedure compatible with both sensor systems is able to be found, then the primary sensor system 2 takes control and carries out its own driving procedure.

If one sensor system 2, 4 is no longer transmitting data due to an electrical or other fault, then the other sensor system 2, 4 automatically takes over vehicle control and carries out its own scheduled driving procedure. This may also be performed by the secondary sensor system 4, which normally does not control the vehicle.

The driving procedure that is performed may be for example an emergency braking procedure, a stopping procedure within a lane, but also slow coasting within a lane. Provision may additionally be made for the driver to receive a request to completely take over the vehicle again.

The vehicle 1 furthermore has a primary actuator system 19 that is normally used and a secondary actuator system 32 that is used if there is a fault with the primary actuator system 19 or the primary sensor system 2.

It is advantageous for the primary sensor system 2 and the primary actuator system 19 to be connected to a different voltage source than the secondary sensor system 4 and the secondary actuator system 32. As a result, in the event of an electrical fault in one of the two voltage sources or in one of the connected controllers, the vehicle may still be put into a safe state.

Both sensor systems 2, 4 are designed so as to completely control the vehicle 1 and to ensure autonomous driving of the vehicle 1. It is advantageous in this case for in each case only one of the two sensor systems 2, 4 to be active. In particular, it is advantageous for the primary sensor system 2 to initially be active and, in the event of a fault or a failure of the primary sensor system 2, for the secondary sensor system 4 to be able to step in and take on the function of the primary sensor system 2.

The perception of the two sensor systems 2, 4 may also be fused in one embodiment. For this purpose, as well as for the transmission of the data to the backend 60, the data are processed in a suitable form and the amount of data is reduced. It is thus not necessary to transmit the complete image information from the camera 10 or the point cloud of the lidar sensor 23. This is advantageous since only a limited amount of bandwidth is available both to the backend 60 and for example between the controllers of the sensor systems 2, 4. A fusion perception may then be created from the data of the other sensor system 2, 4 and the ego perception, this having higher accuracy and a better detection rate. The information from the lidar system 4, which is capable of delivering semantic information only to a limited extent, is in this case also fused with the camera perception. By way of example, the semantic information from the camera may thus be used to enrich the lidar perception with information, for example classification of lidar points as parts of lanes, infrastructure or other road users. In this way, both the lidar mini-map and the lidar perception may be enriched with the information from the camera mini-map, wherein the semantics of the camera however the precise information from the lidar sensor 23 is used. In the same way, however, the detection of road users, lanes or infrastructure by the camera 10 may also be improved. Cameras, in particular monocameras, are able to correctly measure the distance between road users only to a limited extent. It is advantageous here to fuse the object information from the lidar sensor 23. This leads to higher availability and accuracy of the two sensor systems 2, 4. This is particularly advantageous for the primary sensor system 2, since the secondary sensor system 4 is thus not only used as redundancy and for plausibility checks, but also contributes to improving the perception able to be experienced by customers, and thus the driving function.

FIG. 3 shows a schematic block diagram of a transmission process 40 of transmitting created mini-maps 42, 45 of a primary sensor system 41 and a secondary sensor system 44 according to one exemplary embodiment of the invention. The block diagram shown in FIG. 3 shows the sending of data 46 from a vehicle to a backend 60. The mini-maps 42, 45 created by the camera-based sensor system 41 and the lidar-based sensor system 44 are transmitted, together with the vehicle position, to a mobile radio transmitter 43 and transmitted by the mobile radio transmitter 43 to the backend 60 for further processing by way of a wireless data link. The mini-maps 18, 64, 42, 31, 66, 45, processed and plausibility-checked camera partial maps 20, 51, 74 and plausibility-checked lidar partial maps 33, 55, 76 are created in the backend 60. The plausibility-checked camera and lidar maps 20, 51, 74, 33, 55, 76 are then transmitted to a mobile radio receiver 21 located in the vehicle by way of a wireless data link.

FIG. 4 shows a schematic block diagram of a reception process of receiving plausibility-checked camera partial maps 20, 51, 74 and plausibility-checked lidar partial maps 33, 55, 76 according to one exemplary embodiment of the invention. The mobile radio receiver 53 receives the plausibility-checked partial maps 20, 51, 74, 33, 55, 76 and forwards the plausibility-checked camera partial maps 20, 51, 74 to the camera-based sensor system 2 and the plausibility-checked lidar partial maps 33, 55, 76 to the lidar-based sensor system 4.

FIG. 5 shows a schematic block diagram of a backend 60. FIG. 5 shows the various processing steps of processing the mini-maps or environment maps 18, 64, 42, 31, 66, 45 of the camera-based sensor system 2 and the lidar-based sensor system 4.

A mobile radio base station 61 receives the mini-maps 18, 64, 42, 31, 66, 45 of the camera-based sensor system 2 and lidar-based sensor system 4 sent by the vehicle 1 by way of the mobile radio transmitter 43. The data 62 are decoded 63 and processed further by the backend 60. The backend 60 in this case processes the camera mini-maps 18, 64, 42 and lidar mini-maps 31, 66, 45 in each case separately and creates and updates 65, 67 camera maps 65 and lidar maps 67 therefrom. Furthermore, the server creates a fusion map 72 on the basis of the lidar and camera mini-maps 18, 64, 42, 31, 66, 45. This fusion map 72 is used to check the plausibility 73, 75 of the camera map 70 and lidar maps 71. By way of example, restrictions or constraints of a fused map 72 may thereby be inserted into the camera map 70 and/or the lidar map 71. It is known that some types of objects or obstacles are not able to be systematically recognized by one or the other sensor system. In this case, the fusion map 72 may be used to further restrict the drivable space without however adversely affecting the redundancy of the two processing paths. In the plausibility check 73, 75, a plausibility-checked camera partial map or a plausibility-checked primary sensor system partial map 20, 51, 74 are created from the camera map 70 and the fusion map 72 and a plausibility-checked lidar partial map or a plausibility-checked secondary sensor system partial map 33, 55, 76 are created from the lidar map 71 and the fusion map 72. These partial maps 20, 51, 74, 33, 55, 76 are encoded and sent via a wireless data link, for example via a mobile radio base station 61, and made available to the automated vehicle 1.

LIST OF REFERENCE SIGNS 1 automated vehicle
2 camera-based sensor system
3 detection range of the camera-based sensor system
4 lidar-based sensor system
5 detection range of the lidar-based sensor system
6 direction of travel
10 camera
11 acquisition (camera)
12 perception/locating (camera)
13 scheduling (camera)
14 clearance (camera)
15 reception (camera)
16 transmission (camera)
17 lidar perception, scheduling, clearance data
18 camera mini-map, vehicle position
19 primary actuator system
20 (plausibility-checked) camera partial map
21 mobile radio receiver
22 mobile radio transmitter
23 lidar
24 acquisition (lidar)
25 perception/locating (lidar)
26 scheduling (lidar)
27 clearance (lidar)
28 reception (lidar)
29 transmission (lidar)
30 camera perception, scheduling, clearance data
31 lidar mini-map, vehicle position
32 secondary actuator system
33 (plausibility-checked) lidar partial map
34 camera-based sensor system
35 lidar-based sensor system
40 vehicle (transmission)
41 camera-based sensor system
42 camera mini-map, vehicle position
43 mobile radio transmitter
44 lidar-based sensor system
45 lidar mini-map, vehicle position
46 data
50 vehicle (reception)
51 plausibility-checked camera partial map
52 camera-based sensor system
53 mobile radio receiver
54 data
55 plausibility-checked lidar partial map
56 lidar-based sensor system
60 backend
61 mobile radio base station
62 data
63 data decoding
64 camera mini-map, vehicle position
65 camera map update
66 lidar mini-map, vehicle position
67 lidar map update
68 camera mini-map, vehicle position, lidar mini-map
69 fusion map update
70 camera map
71 lidar map
72 fusion map
73 camera maps plausibility check
74 plausibility-checked camera partial map
75 lidar maps plausibility check
76 plausibility-checked lidar partial map
77 data encoding
78 mobile radio base station

The invention claimed is:

1. A method for locating a vehicle in an environment, the method comprising steps performed in the following order:
providing a primary sensor system;
providing a secondary sensor system, wherein the secondary sensor system is configured to provide protection for the primary sensor system, wherein the primary sensor system and the secondary sensor system are configured to completely control the vehicle;
detecting environment data by way of the primary sensor system and the secondary sensor system;
creating, by a computer system, environment maps from the environment data of the primary sensor system and the secondary sensor system;
transmitting, from the computer system, the created environment maps of the primary sensor system and the created environment maps of the secondary sensor system to a different computer system;
generating, by the different computer system, at least one plausibility-checked primary sensor system partial map and at least one plausibility-checked secondary sensor system partial map based on the transmitted environment maps;
transmitting, from the different computer system, the at least one plausibility-checked primary sensor system partial map to the primary sensor system and transmitting, from the different computer system, the at least one plausibility-checked secondary sensor system partial map to the secondary sensor system;
locating, by the primary sensor system, the vehicle in the environment by comparing the environment data of the primary sensor system with the at least one plausibility-checked primary sensor system partial map and locating, by the secondary sensor system, the vehicle in the environment by comparing the environment data of the secondary sensor system with the at least one plausibility-checked secondary sensor system partial map;
comparing the locating of the vehicle by the primary sensor system with the locating of the vehicle by the secondary sensor system, wherein the comparing is based on an amount of compatibility between the locating of the vehicle;

granting clearance to continue automated driving of the vehicle by way of the primary sensor system and by way of the secondary sensor system, wherein the clearance is granted based on the amount of compatibility being within predefined limits; and performing a driving procedure as soon as the clearance of one of the two sensor systems has not been granted and the locating of the vehicle from one of the two sensor systems does not lie within the predefined limits.

2. The method as claimed in claim 1, wherein generating the at least one plausibility-checked primary sensor system partial map and the at least one plausibility-checked secondary sensor system partial map further comprises:

creating a fusion map on the basis of the environment maps of the primary sensor system and the environment maps of the secondary sensor system; and using the fusion map to create the at least one plausibility-checked primary sensor system partial map and to create the at least one plausibility-checked secondary sensor system partial map.

3. The method as claimed in claim 1,
wherein the computer system comprises a primary computing unit and a secondary computing unit,
wherein the environment maps are created from the environment data of the primary sensor system by way of the primary computing unit, and
wherein the environment maps are created from the environment data of the secondary sensor system by way of the secondary computing unit.

4. The method as claimed in claim 3, wherein the different computer system comprises a third computing unit, and wherein generating the at least one plausibility-checked primary sensor system partial map and the at least one plausibility-checked secondary sensor system partial map are performed on the third computing unit.

5. The method as claimed in claim 4, wherein the third computing unit is part of a backend, wherein the backend is located outside the vehicle.

6. The method as claimed in claim 1, wherein transmitting the created environment maps of the primary sensor system and the created environment maps of the secondary sensor system to the different computer system is carried out by way of a wireless data link.

7. The method as claimed in claim 1, wherein the primary sensor system is a camera-based sensor system.

8. The method as claimed in claim 1, wherein the secondary sensor system is a lidar-based sensor system.

9. The method as claimed in claim 1, wherein performing the driving procedure comprises an emergency braking procedure or a stopping procedure within a lane or slow coasting within the lane or a request to a driver to completely take over the vehicle.

10. A device for locating a vehicle in an environment, wherein the device is configured to perform the method as claimed in claim 1.

11. A driver assistance system at least having a module configured to carry out the method as claimed in claim 1.

12. The method as claimed in claim 1, wherein the primary sensor system is connected to a primary actuator and the secondary sensor system is connected to a secondary actuator, wherein the primary sensor system and the primary actuator are connected to a primary voltage source and the secondary sensor system and the secondary actuator are connected to a secondary voltage source that is different from the primary voltage source.

13. The method as claimed in claim 12, further comprising:

overtaking control of the vehicle from the primary sensor system, the primary actuator, and the primary voltage source by the secondary sensor system, the secondary actuator, and the secondary voltage source, wherein the secondary sensor system is configured to perform the driving procedure.

14. A non-transitory machine-readable medium comprising a plurality of machine-readable instructions executed by one or more processors, the plurality of machine-readable instructions causing the one or more processors to perform operations for locating a vehicle in an environment, the operations comprising steps in the following order:

providing a primary sensor system;

providing a secondary sensor system, wherein the secondary sensor system is configured to provide protection for the primary sensor system, wherein the primary sensor system and the secondary sensor system are configured to completely control the vehicle;

detecting environment data by way of the primary sensor system and the secondary sensor system;

creating, by a computer system, environment maps from the environment data of the primary sensor system and the secondary sensor system;

transmitting, from the computer system, the created environment maps of the primary sensor system and the created environment maps of the secondary sensor system to a different computer system;

generating, by the different computer system, at least one plausibility-checked primary sensor system partial map and at least one plausibility-checked secondary sensor system partial map based on the transmitted environment maps;

transmitting, from the different computer system, the at least one plausibility-checked primary sensor system partial map to the primary sensor system and transmitting, from the different computer system, the at least one plausibility-checked secondary sensor system partial map to the secondary sensor system;

locating, by the primary sensor system, the vehicle in the environment by comparing the environment data of the primary sensor system with the at least one plausibility-checked primary sensor system partial map and locating, by the secondary sensor system, the vehicle in the environment by comparing the environment data of the secondary sensor system with the at least one plausibility-checked secondary sensor system partial map;

comparing the locating of the vehicle by the primary sensor system with the locating of the vehicle by the secondary sensor system, wherein the comparing is based on an amount of compatibility between the locating;

granting clearance to continue automated driving of the vehicle by way of the primary sensor system and by way of the secondary sensor system, wherein the clearance is granted based on the amount of compatibility being within predefined limits; and performing a driving procedure as soon as the clearance of one of the two sensor systems has not been granted and the locating of the vehicle from one of the two sensor systems does not lie within the predefined limits.

\* \* \* \* \*